US008875439B2

United States Patent
Moulis

(12) United States Patent
(10) Patent No.: US 8,875,439 B2
(45) Date of Patent: Nov. 4, 2014

(54) CULTIVATION OF HAZEL TREE WITH THE CROWN HAVING THE FORM OF VERTICAL SPINDLE ON THE SUPPORT

(76) Inventor: Vlado Moulis, Daruvar (HR)

( * ) Notice: Subject to any disclaimer, the term of this patent is extended or adjusted under 35 U.S.C. 154(b) by 80 days.

(21) Appl. No.: 13/513,210

(22) PCT Filed: Oct. 22, 2010

(86) PCT No.: PCT/HR2010/000037
§ 371 (c)(1),
(2), (4) Date: Jun. 1, 2012

(87) PCT Pub. No.: WO2011/067617
PCT Pub. Date: Jun. 9, 2011

(65) Prior Publication Data
US 2012/0240461 A1  Sep. 27, 2012

(30) Foreign Application Priority Data
Dec. 2, 2009  (HR) .............................. P 20090642 A

(51) Int. Cl.
*A01G 1/00* (2006.01)
*A01G 17/00* (2006.01)

(52) U.S. Cl.
CPC ...................................... *A01G 17/00* (2013.01)
USPC .................................. 47/58.1 SE; 47/58.1 R

(58) Field of Classification Search
USPC ..................................... 47/58.1 SE, 58.1 R, 8
See application file for complete search history.

(56) References Cited

FOREIGN PATENT DOCUMENTS

SU  1713494  2/1992
UA  68095  7/2004

*Primary Examiner* — Monica Williams
(74) *Attorney, Agent, or Firm* — Jacobson Holman Hershkovitz, PLLC.

(57) ABSTRACT

Cultivation of hazel tree with the crown having the form of a vertical spindle on a support represents a new way of planting and cultivation of hazel trees. FIG. 3 shows cultivation of hazel tree in double rows, which have crowns in the form of a vertical cylinder shown in FIG. 1. A skeleton of the basic tree consists of a central line without trunk, having on it radially arranged primary and yielding branches. During the life of a basic tree branches are cut forming the crown on the line that may grow up to 3 or 5 meters and the external diameter of the spindle of the crown may be from 0.5 up to 1 meter. The skeleton is weak and the basic trees are leant against supports.

9 Claims, 2 Drawing Sheets

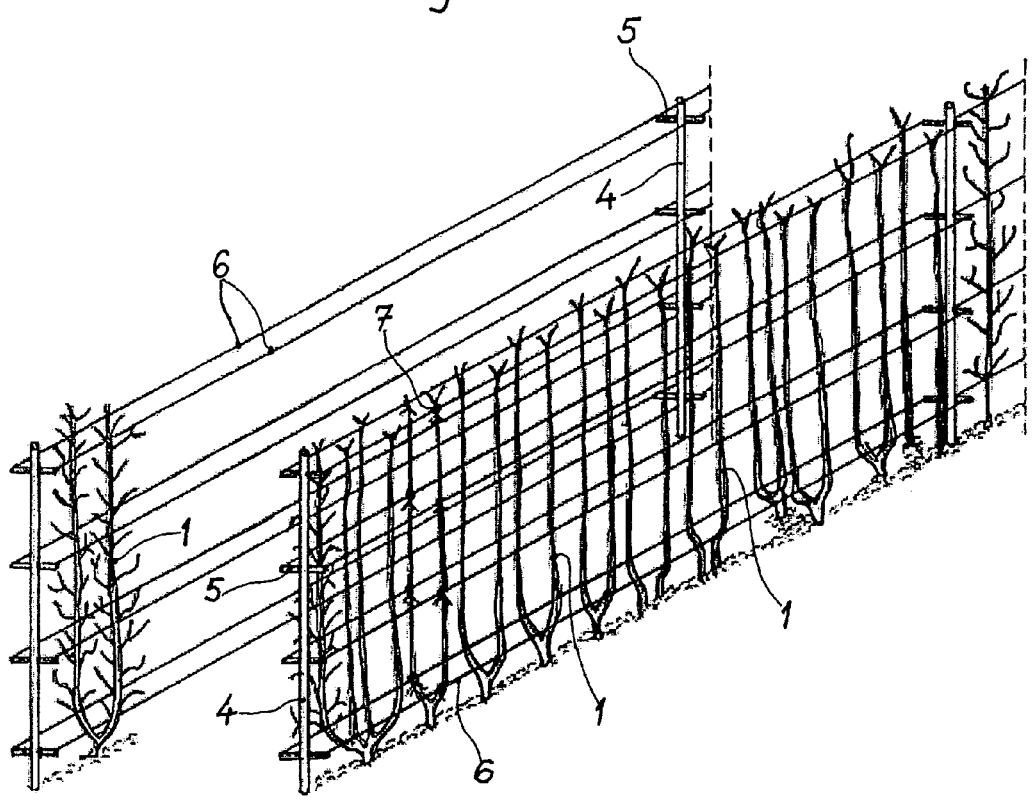

CULTIVATION OF HAZEL TREE WITH THE CROWN HAVING THE FORM OF VERTICAL SPINDLE ON THE SUPPORT

This is a national stage of PCT/HR10/000037 filed Oct. 22, 2010 and published in English, which claims the priority of Croatia number P 20090642 A filed Dec. 2, 2009, hereby incorporated by reference.

TECHNICAL FIELD

The scope of the invention is a new way of intensive cultivation of a hazel tree. Planting the hazel tree seedlings is performed mainly in rows in which on one planting place there is planted one or more seedlings. In course of cultivation from each of seedling there is left one or more branches which in further cultivation serve as central line round which there are formed crowns. Round each seedling by cutting we obtain the crown in the form of vertical cylinder resp. spindle, having approximately same form of cross-section along the whole height. The lines are tied by the height on one or more places for the support because of their disembarrassment and maintenance of distance among neighboring lines.

According to the seventh edition of International Classification, the invention belongs to fields of technique identified with following marks:

A01C—Planting; Sowing; Fertilization.
A01G—Horticulture, Cultivation of vegetables, flowers, rice, fruit, wine grape, hop or algae; Forestry; Irrigation.

Technical Problem

The basic indicator of successfulness of intensive cultivation of hazel tree as agricultural activity is the yield defined as the mass o quantity of fruits picked in one harvesting by one hectare of the ground surface on which hazel tree was planted. The yield of planted hazel trees depends on a number of factors as e.g.: kind and composition of ground, climatic circumstances of a habitat, sort of hazel tree, preparation and treatment of soil and reinforced nutrition. One of the important factors of the yield is also the cultivation form of the crown. The following properties depend on the cultivation form of the crown: firmness of the crown skeleton, yielding or overgrowing surface by the unit of production space, usability of light in the crown and production space, possibility of application of mechanization, technology of forming the crown, uniformity of yield of single parts of the crown and the length of time period of the yield.

The new cultivation form of the crown according to the invention solves the technical problem of the yield of planted hazel tree in intensive cultivation.

BACKGROUND ART

In the modern intensive cultivation of hazel tree, there is known a number of groups of cultivation forms.

The first group makes cultivation of a hazel tree in form of a bush. In cultivation in a bush form there is practiced the simple bush cultivated from one seedling or a bush made of more seedlings planted on a smaller distance. Seedlings in one bush are arranged in the form of equilateral triangle, square or circle in the way, that there is obtained a loose bush open in the middle for the purpose of penetration of light in the crown of the bush. Hazel tree cultivated in the bush form is of a lusher growth and therefore bushes should be planted at larger distance. The yield of a hazel tree planted in the form of a bush is larger n the first years after planting than in later years because with growing older, the yield of a bush s reduced. This form of cultivation is suitable for smaller, family orchards in which a large number of complex technical activities are made by hand.

The second group is cultivation of a hazel tree in the form of a tree with various thicknesses of trunks. A trunk may have various heights that may range from 0.2 to 0.8 meters above which by cutting there is formed a crown in the form of vase. This cultivation form has a firm skeleton, well usability of light and large yielding area. In cultivation of a hazel tree with a trunk there are reached larger crops by the unit of planted area than in cultivation in form of a bush. This plantation form enables application of mechanization and modern agrotechnical interventions including mechanization of harvesting and is therefore mainly applied on plantations of agriculturally developed countries.

The third group is cultivation of hazel tree in the form of live fence. This cultivation form was suggested by the Italian expert Romisondo, According to his suggestion, a hazel is planted in rows at a distance of 5 to 6 meters. In one row there are planted two seedlings each, fronting each other at a distance of 0.35 to 0.40 meters, deviated one from the other under the angle of 35° in direction of extending the row. Pairs of inclined seedlings within one row are planted at a distance of 2 to 2.5 meters.

In the patent document No. SU1713494 there is described the cultivation of a hazel similar to the mentioned cultivation of hazel in the form of live fence. In the mentioned document there is described the cultivation of a hazel planted in parallel double rows which lines of symmetry are at a distance from 7 to 8 meters one from the other. In one row there are also planted two seedlings together, one opposite to the other at a distance of 0.4 to 0.5 meters. In course of growth, seedlings are declining one from the other under the angle of 55° to 60° towards the plane of the ground in the plane vertical to the direction of extension of a row. Pairs of inclined seedlings within one row are planted at a distance from 1.5 to 2.0 meters.

The patent document No. UA68095 describes cultivation of a high and semi-high hazel together with the Scotch pine. These two kinds of trees are planted and cultivated in widely distant rows, so that they are mutually arranged in the form of a chessboard.

Essence of the Invention

The basic tree of the cultivation form of a hazel according to the invention, in the period of the yield has a crown in form of a vertical cylinder, resp. spindle. The skeleton of the basic tree consists of the central line without a trunk, having on it radially arranged branches. In course of cultivation branches are cut along the whole height of the line, so that the crown gets externally the form of vertical spindle or cylinder. In case of cultivation of a hazel in rows, crowns may have the form of a prism with rectangular base. The height of a basic tree is many times larger than the largest dimensions of its base. The crown has nearly the uniform form of cross-section. External closed curve of the cross-section of a crown may generally have the form of smooth curve as it is a circle or ellipse or broken up closed curve as it is a triangle, square, rectangle or other polygon. Because of static instability of a skeleton, in course of cultivation the line is tied on more places to the support.

On one planting place there is possible to cultivate one or more basic trees from one or more seedlings. From one seedling planted on one planting place, one, two or three basic trees may be cultivated. From two or more seedlings planted on one planting place it is possible to cultivate two, four or more basic trees.

The form of a basic tree of the cultivation form of hazel tree according to the invention enables extensive cultivation of hazel trees on smaller area or intensive cultivation of hazel trees on large areas. In intensive cultivation the hazel tree is planted in rows on which there are put wire-supports on piles to which lines are tied. Wire-supports may be made as one-row or two-rows on more levels up to the maximum height of the basic tree, adequate for application of mechanization in cultivation.

DESCRIPTION OF FIGURES

FIG. 3 shows schematically the cultivation of hazel trees in double rows which basic trees have the form of vertical spindle with lines tied to wire supports.

DISCLOSURE OF THE INVENTION

Figure 1:
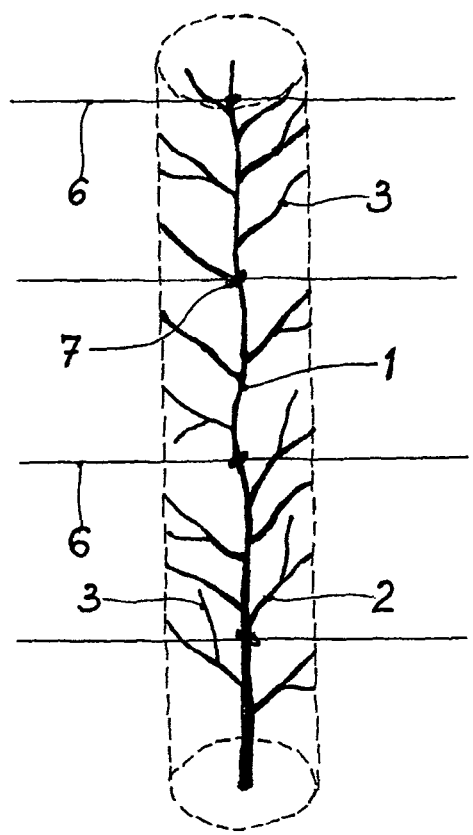
FIG. 1 shows schematically the skeleton of a basic hazel tree with the crown having the form of vertical spindle on a support in fully developed state, cultivated from one seedling.

The basic tree of a cultivation form of a hazel tree according to the invention has in the yield period a crown with leaves in the form of vertical cylinder resp. spindle shown in FIG. 1. The skeleton of a basic tree consists of one central line 1 having on it radially arranged primary branches 2 and secondary or yield branches 3. Primary branches 2 growing directly from the line 1 have on themselves yielding branches 3. Yielding branches 3 grow also directly from the line 1. Primary branches 2 with yielding branches 3 and yielding branches 3 growing directly from the line 1 are evenly arranged along the complete height of the line 1. In course of the whole life of the basic tree, from planting till the full age of 40 to 50 years, branches are cut and crowns formed on the line that may grow up from 3 to 5 meters. External diameter of the crown spindle may be from 0.5 to 1 meter. The length of primary and secondary branches in the crown, may reach the height of 0.2 to 0.5 meters.

Figure 2:
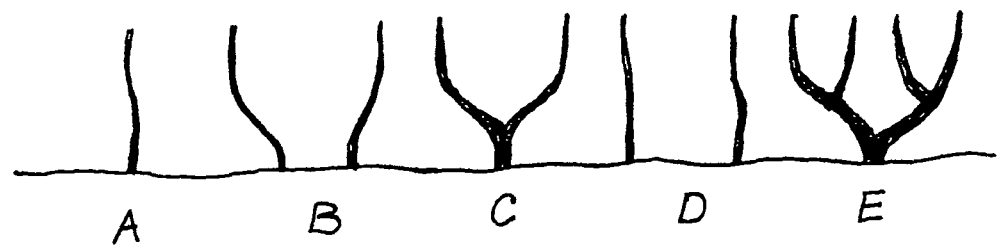
FIG. 2 shows schematically planting places with various kinds of cultivation of the hazel seedlings in the first years.

On one seedling there may be cultivated one or more basic trees. FIG. 2 shows five planting places with seedlings in the first year of cultivation.

On planting places A, C and E there is planted one seedling. From one seedling on the planting place A, by cutting there is cultivated one line of the basic tree. On the planting place C, from one seedling, by cutting there are cultivated two lines in the way, that on the height of 0.2 to 0.3 meters from the ground there are cultivated two branches serving as lines of two basic trees. On the planting place E there are by cutting cultivated four lines. It is possible, to cultivate from one seedling four or more lines in the way, that immediately upon planting there is done cutting a seedling on the height of 0.1 to 0.15 meters from which in the next year there are left two primary branches that are shortened to 0.1 to 0.15 meters. In the third year, on each primary branch there are left one or two secondary branches, cultivating in coming years as lines of separate basic trees. Mutual distances of lines cultivated from one seedling are 0.5 to 1 meter so that on each line there may be developed a crown without hindrances.

On planting places B and D, for the purpose of illustration there are shown planting places each with two seedlings on each planting place. From each seedling on these planting places, it is possible to cultivate in the described manner one, two or more basic trees.

Cultivation form of a hazel tree according to the invention, shown in FIG. 1 is suitable also for extensive cultivation on smaller areas, on which cutting, soil preparation, harvesting and other cultivation activities are done mainly by hand and for intensive cultivation of hazel trees on larger areas, on which cutting, ground preparation, harvesting and other cultivation activities are done mainly with application of mechanization.

In extensive cultivation the arrangement of planting places may be at random or in rows which may depend also on configuration of a ground on which a hazel tree is cultivated. Tying lines to support in planting at random is made on more places to stakes driven in the ground in direct vicinity of lines.

In intensive cultivation the best results are achieved by cultivation in single or double rows as shown on the FIG. 3.

Planting hazel trees in double rows starts with making the supporting accessories in rows which centers are mutually distant from 3 to 5 meters. Accessories consist of piles 4 which height above the ground is 3 to 5 meters. The distance among neighboring piles 4 in one row is 5 to 10 meters. Each pile 4 has more horizontal crossbars 5. Wire supports 6, made on more levels, are spread between both ends of crossbars 5 placed in the same level of two neighboring piles 4. The full supporting accessories have two rows of wire supports 6 that are mutually distant from 0.5 to 1 meter. Planting one or more seedlings on each planting place is performed before spreading the wire supports 6. Distance among neighboring planting places in one row is 0.5 to 1 meter. In course of first years of cultivation, by cutting seedlings there is determined a number of lines on each seedling. The number of basic trees on that place depends on the number of seedlings and the number of lines cultivated on one planting place. In course of later cultivation to the full height of 3 to 5 meters, lines on one planting place are oriented to one of two rows of wire supports 6 to which they are tied by bonds 7.

In course of the whole life of planted hazel trees which basic trees have the crown in the form of vertical cylinder on the support, at least once a year branches should be cut. Cutting planted hazel trees in double rows is made by hand because of density of plants in rows and among rows in the line of trees. By manual cutting it is possible to make selection of fertile branches within each crown, their lengths and forming a crown in the cylinder.

Cutting planted hazel tree in simpler, single rows may be performed with larger share of cheaper machine procedures and simpler form of the basic tree crown in the form of vertical prism with rectangular base.

By cultivation of hazel trees with crowns in form of vertical spindle on the support according to the invention, with adequate technical and agrotechnical interventions there is enabled a control of the yield potential in all parts of cultivation form, good lighting and photosynthesis, high rationality factor and regular and good yield of high quality fruits.

The invention claimed is:

1. A method for the cultivation of at least one hazel tree with a crown having the form of a vertical spindle on a support in a fully developed state, comprising the steps of:
    planting at least one hazel tree seedling and allowing the seedling to grow and form a hazel tree with a branch;
    pruning by splitting the branch within the first year of planting to form two sub-branches.

2. The method according to claim 1, wherein a plurality of hazel tree seedlings are planted in two parallel rows with a distance of 3 to 5 meters between the two rows; wherein the seedlings within each row have a mutual distance of 0.5 to 1 meter.

3. The method according to claim 2, wherein the support comprises a plurality of support frames, wherein each support frame is provided at an end of each row; wherein each support frame comprises a vertical pole and a plurality of horizontal cross-bars; wherein a wire connects ends of corresponding crossbars of the support frames within the same row.

4. The method according to claim 3, wherein the vertical poles has a height of 3 to 5 meters above ground, and are spaced apart 5-10 meters in one row; wherein the horizontal crossbars are spaced apart 0.5-1 meter along one vertical pole.

5. The method according to claim 1, wherein during the whole life cycle of hazel tree, manual and/or machine pruning by splitting of the branches and the crown is carried out at least once a year.

6. The method according to claim 5, wherein the hazel tree in the fully developed state has a vertical cylinder shape of uniform cross-section, with a height of 3 to 5 meters and a diameter of 0.5 to 1 meter, with a skeleton consisting of:
- a central branch,
- radially arranged primary branches attached along whole height of the central branch each with a length of 0.2 to 0.5 meter,
- secondary yielding branches attached to the primary yielding branches each with a length of 0.2 to 0.8 meter.

7. A method for the cultivation of at least one hazel tree with a crown having the form of a vertical spindle on a support in a fully developed state, comprising the steps of:
- planting at least one hazel tree seedling and allowing the seedling to grow and form a hazel tree with a branch of one year old;
- pruning by splitting the branch of one year old during the period between the first year and the second year of the planting to form two branches of two years old;
- pruning by splitting at least one of the branches of two years old during the period between the second year and the third year of the planting to form two branches of three years old; and
- pruning by splitting at least one of the branches of three years old during the period between the third year and the fourth gear of the planting to form two branches of four years old;
- wherein the branches of the hazel tree are tied to the support at different heights.

8. The method according to claim 7, wherein the hazel tree in the fully developed state has a vertical cylinder shape of uniform cross-section, with a height of 3 to 5 meters and a diameter of 0.5 to 1 meter, with a skeleton consisting of:
- a central branch,
- radially arranged primary branches attached along whole height of the central branch each with a length of 0.2 to 0.5 meter,
- secondary yielding branches attached to the primary yielding branches each with a length of 0.2 to 0.8 meter.

9. The method according to claim 7, wherein a plurality of hazel tree seedlings are planted in two parallel rows with a distance of 3 to 5 meters between the two rows; wherein the seedlings within each row have a mutual distance of 0.5 to 1 meter.

* * * * *